United States Patent
Mathis et al.

[15] 3,692,738
[45] Sept. 19, 1972

[54] ULTRAVIOLET STABILIZER SYSTEM FOR POLYOLEFINS

[72] Inventors: Ronald D. Mathis, Mauldin; James S. Dix, Taylors, both of S.C.

[73] Assignee: Phillips Petroleum Company

[22] Filed: April 8, 1971

[21] Appl. No.: 132,618

[52] U.S. Cl. ......260/45.75 N, 252/400, 260/45.85 R, 260/45.95
[51] Int. Cl. .............................................C08f 45/62
[58] Field of Search .....260/45.75 N, 45.85 R, 45.95; 252/406, 400

[56] References Cited

UNITED STATES PATENTS

| | | | |
|---|---|---|---|
| 3,215,717 | 11/1965 | Foster | 260/45.75 |
| 3,214,399 | 10/1965 | Saccomandi | 260/45.75 |
| 3,379,680 | 4/1968 | O'Konski | 260/45.75 |
| 3,272,853 | 9/1966 | Brawn | 260/45.75 |

*Primary Examiner*—Donald E. Czaja
*Assistant Examiner*—V. P. Hoke
*Attorney*—Young & Quigg

[57] ABSTRACT

An ultraviolet light stabilizer composition for polyolefins which comprises (2,2'-thiobis [4-tert-octylphenolato])-n-butylamine nickel (II) and a nickel complex of a halogenated $\beta$-diketone.

10 Claims, No Drawings

ULTRAVIOLET STABILIZER SYSTEM FOR POLYOLEFINS

In the production of polyolefin fibers and films, for example those produced from polypropylene, it is customary to incorporate in the polyolefin certain materials which act to protect the polyolefin from deterioration by ultraviolet light.

Various ultraviolet light stabilizers are available commercially. One such group of stabilizers which is available commercially comprises a nickel complex and includes (2,2'-thiobis[4-tert-octylphenolato])-n-butylamine nickel (II). This material is usually effective when incorporated in the olefin polymer in amounts of about 0.1–1.0 parts per hundred parts (php), or more, of polymer by weight. While this stabilizer is one of the most effective known, it has now been determined that its effectiveness can be significantly increased by incorporating it into the polymer as a part of a system comprising a plurality of nickel complexes. This invention concerns this improved stabilizer composition.

According to this invention there is provided an additive composition for incorporating in polyolefins for ultraviolet light stabilization which comprises, as a first component, a nickel complex of a halogenated $\beta$-diketone, the halogenated $\beta$-diketone having the general formula

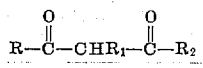

in which R is $CX_3$ in which X is fluorine, bromine, chlorine and iodine, $R_1$ is hydrogen, aryl, alkyl, cycloalkyl, a heterocyclic radical and combinations thereof containing up to 20 carbon atoms; $R_2$ is alkyl, aryl, cycloalkyl, a heterocyclic radical and combinations thereof containing up to 20 carbon atoms, and as a second component a nickel complex having the general formula

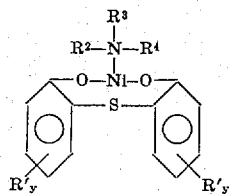

in which formula $R'$ is hydrogen, alkyl, aryl, heterocyclic, cycloalkyl or combinations thereof; $R^2$, $R^3$, $R^4 = R'$ or hydroxyl or thiol derivatives thereof, and y has a value of from 0 to 4.

Examples of suitable $\beta$-diketones are 1,1,1-trifluoro-2,4-pentanedione, 1,1,1-trifluoro-5,5-dimethyl-2,4-hexanedione and 4,4,4-triiodo-1-(2-thienyl)-1,3-butanedione. One of the most effective is the nickel complex of 1,1,1-trifluoro-7-methyl-2,4-octanedione.

This latter compound is prepared by dissolving 4 g of 1,1,1-trifluoro-72,4-octanedione in 50 ml of diethyl ether and adding thereto a solution of 2.4 g of nickel acetate tetrahydrate in water corresponding to a molar ratio of substantially 2 to 1, respectively of the ketone and nickel salt. The resulting mixture is shaken vigorously and allowed to stand until the reaction has proceeded and the ether and water layers have separated. The ether layer is recovered, water-washed and dried over anhydrous sodium sulfate. After decantation from the sodium sulfate, the ether is evaporated to leave as residue the green-colored nickel complex of 1,1,1-trifluoro-72,4-octanedione which has a nickel content of about 12 percent.

Examples of compounds employable as the second component are (2,2'-thiobis[4-tert-octylphenolato])-n-butylamine nickel (II), (2,2'-thiobis[4-tert-octylphenolato])triethanolamine nickel (II) and (2,2'-thiobis[4-tert-octyl-phenolato])cyclohexyldi ethanolamine nickel (II). Such materials are commercially available.

This additive composition can be incorporated in the polyolefin in any suitable manner. Preferably, either component is incorporated in individual amounts of between about 0.1 and 1.5 php of polymer. Preferably, the components are incorporated in about equal amounts, preferably in amounts of about 0.25 parts of each per 100 parts by weight of polymer. However, the ratio of the commerical nickel complex and the nickel complex of the fluorinated $\beta$-diketone can vary from one-fourth to four since the complexes are approximately equal in effectiveness as a UV stabilizer when employed individually.

As mentioned, it is the prior art practice to incorporate (2,2-thiobis-[4-tert-octylphenolato])-n-butylamine nickel (II) in polyolefin polymers as an ultraviolet light stabilizer. The addition of the nickel complex of the fluorinated $\beta$-diketone thereto is made in replacement of a portion of the butylamine nickel (II) complex. The net result, however, is to produce a stabilizer system of an effectiveness greater than that of the former compound, alone. In other words, while the nickel complex of the fluorinated $\beta$-diketone is preferably added only to the extent that the butylamine nickel (II) complex is replaced, the polyolefin to which the improved stabilizer composition is added is stabilized to a greater degree than is to be expected in view of the individual stabilization abilities of the compounds. This is illustrated by the following example.

Three substantially identical quantities of polypropylene had incorporated in them, individually, the aforementioned butylamine nickel (II) complex, designated below as "A," the fluorinated $\beta$-diketone nickel complex, designated below as "B", and the improved stabilizer composition comprising the butylamine nickel (II) complex and the fluorinated $\beta$-diketone nickel complex in the quantities indicated below.

In each instance, the same polypropylene was employed, it being a substantially crystalline polymer having a nominal melt flow of 3. The poly-propylene was formed into film having a thickness of 5 mils, in which form the samples were tested in a Weather-Ometer in which exposure to the radiation was at an angle of about 90°, the Weather-Ometer being modified by disconnecting the water-spray cycle and adding eight 20-watt Westinghouse fluorescent sunlamps according to the procedure described in Anal. Chem. 25, 460 (1953). Each polypropylene sample also contained the equal quantities of an antioxidant normally employed in thermally stabilized polypropylene formulations. Results were as follows:

| Stabilizer | Amount, php | Hours to Failure |
|---|---|---|
| A | 0.5 | 1040 |

| B     | 0.5         | 1093 |
| A & B | 0.25 & 0.25 | 1547 |

It will be seen from the above data that the composite stabilizer blend is more effective than the individual stabilizers, alone, even when the total quantity of the two stabilizers is no greater than that quantity of either stabilizer individually employed. In this respect, samples containing the commercial antioxidant, alone, the antioxidant being a commercial hindered phenol in amounts up to about 0.02 php, indicate only about 100 hours to failure.

The above mentioned antioxidants include octadecyl[3-(3,5-di-t-butyl-4-hydroxyphenyl)]propionate, tetrakis[methylene(3,5-di-t-butyl-4-hydroxyhydrocinnamate)]methane, 2,6-di-t-butyl-4-methylphenol, di-n-octadecyl(3,5-di-t-butyl-4-hydroxybenzyl)phosphonate, and others.

It should be understood that while, in each of the examples demonstrated herein, an antioxidant was contained in the polymer composition, the inclusion of the antioxidant was made for the purpose of stabilizing the polymer against oxidative degradation and not for the purpose of facilitating the operability of the stabilizer compositions. The stabilizer composition, which is the subject of this invention, is operable in the absence of such antioxidants in the polymer compositions.

It will be evident from the foregoing that various modifications can be made to this invention. Such modifications, however, are considered to be within the scope of the invention.

What is claimed is:

1. An ultraviolet light stabilizer composition for polyolefins which comprises as a first component a nickel complex of a halogenated $\beta$-diketone, the halogenated $\beta$-diketone having the general formula

in which R is $CX_3$ in which X is fluorine, bromine, chlorine or iodine, $R_1$ is hydrogen, aryl, alkyl, cycloalkyl, a heterocyclic radical or combinations thereof containing up to 20 carbon atoms and $R_2$ is alkyl, aryl, cycloalkyl, a heterocyclic radical or combinations thereof containing up to 20 carbon atoms, and as a second component a nickel complex having the general formula

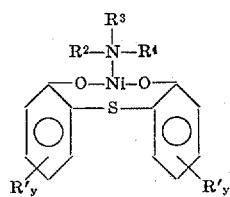

in which R' is hydrogen, alkyl, aryl, heterocyclic, cycloalkyl or combinations thereof, $R^2$, $R^3$, and $R^4$ are independently selected from the group consisting of $R^1$, hydroxy and thiol radicals and y has a value of from 0 to 4, said first component being formed by contacting a first solution comprising a halogenated $\beta'$-diketone and a water-immiscible organic liquid with a second solution comprising a nickel salt, said first component being soluble in and recovered from said organic liquid, said halogenated $\beta'$-diketone and said nickel salt being employed in molar ratios of substantially 2 to 1, respectively.

2. The composition of claim 1 in which said first and second components are incorporated in said polyolefin in individual amounts within the range of 0.1 to 1.5 parts per hundred parts of polymer, said first component being formed by contacting a solution comprising a halogenated $\beta'$-diketone and diethyl ether with an aqueous solution comprising an organic nickel salt, said first component being soluble in and recovered from said diethyl ether.

3. The composition of claim 1 in which said first and said second components are incorporated in said polyolefin in equal amounts and said first component is formed by contacting a solution comprising 1,1,1-trifluoro-7-methyl-2,4-octanedione and diethyl ether with a solution comprising nickel acetate tetrahydrate and water, said first component being soluble in and recovered from said diethyl ether.

4. The composition of claim 1 in which said first component is a nickel complex of 1,1,1-trifluoro-7-methyl-2,4-octanedione and said second component is at least one of (2,2'-thiobis[4-tert-octylphenolato])-n-butylamine nickel (II), (2,2'-thiobis-[4-tert-octylphenolato])triethanolamine nickel (II) and (2,2-thiobis[4-tert-octylphenolato])cyclohexyldiethanolamine nickel (II).

5. The composition of claim 4 in which said first and said second components are incorporated in said polyolefin in individual amounts within the range of 0.1 to 1.5 parts per hundred parts of polymer.

6. The composition of claim 4 in which said first and said second components are incorporated in said polyolefin in equal amounts.

7. A polyolefin composition comprising a polyolefin and the composition of claim 1.

8. A polyolefin composition comprising polypropylene and the composition of claim 1.

9. A polyolefin composition comprising polypropylene and the composition of claim 5.

10. A polyolefin composition comprising polypropylene, the composition of claim 6, and an antioxidant, each of said first and second components being incorporated in said polypropylene in amounts of about 0.25 parts per hundred parts of said polypropylene.

* * * * *